United States Patent [19]

Udelle et al.

[11] Patent Number: 5,794,568
[45] Date of Patent: Aug. 18, 1998

[54] ANIMAL ATTRACTANT AND SCRATCHING DEVICE

[76] Inventors: Steven D. Udelle; Laura L. Udelle, both of 13 Seasons Dr., Punta Gorda, Fla. 33983-5432

[21] Appl. No.: 863,738

[22] Filed: May 27, 1997

[51] Int. Cl.[6] ............................................. A01K 29/00
[52] U.S. Cl. ................................ 119/707; 446/397
[58] Field of Search ............................ 119/706, 707, 119/708, 702, 711; 446/397, 404

[56] References Cited

U.S. PATENT DOCUMENTS

| | | | |
|---|---|---|---|
| 4,120,496 | 10/1978 | Niina | 446/397 |
| 5,163,381 | 11/1992 | Kraski | 119/708 |
| 5,304,084 | 4/1994 | Liao | 446/404 |
| 5,529,017 | 6/1996 | Udelle et al. | 119/707 |
| 5,575,240 | 11/1996 | Udelle et al. | 119/707 |
| 5,657,721 | 8/1997 | Mayfield et al. | 119/707 |

*Primary Examiner*—Todd E. Manahan

[57] ABSTRACT

A device that broadcasts several different mouse related sounds to entice an animal into play and necessary claw scratching is comprised of a hollow rock-shaped housing having a flat base. A dual circuit electronic sound synthesizer is concealed within the hollow housing and its first circuit is activated by an on-off switch. The first circuit broadcasts an intermittant mouse related scratching sound. The second circuit is activated by a pressure sensitive switch pad located in each access opening on the housing's surface thereby broadcasting a brief mouse related squeaking sound when activated by an animal's paw. A claw scratching material is affixed to the housing surface, whereby an animal may satisfy its claw scratching needs.

10 Claims, 1 Drawing Sheet

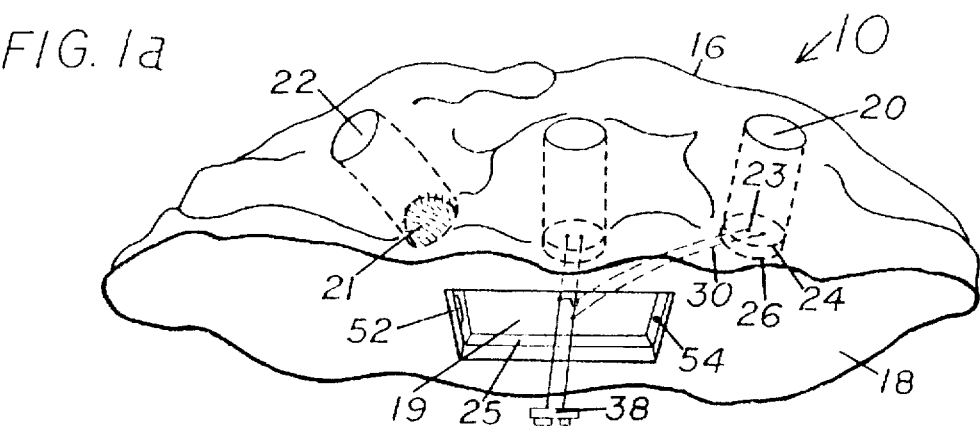
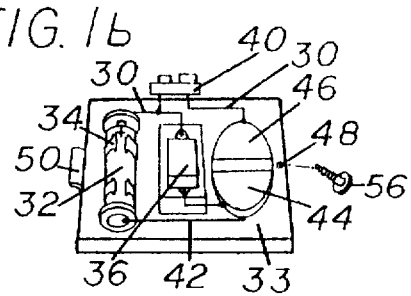
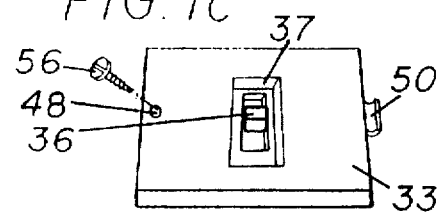
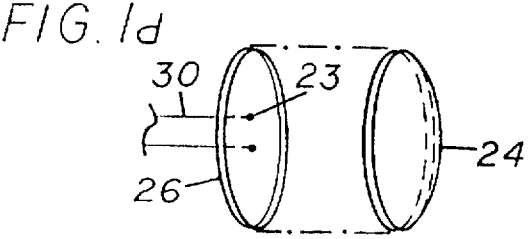
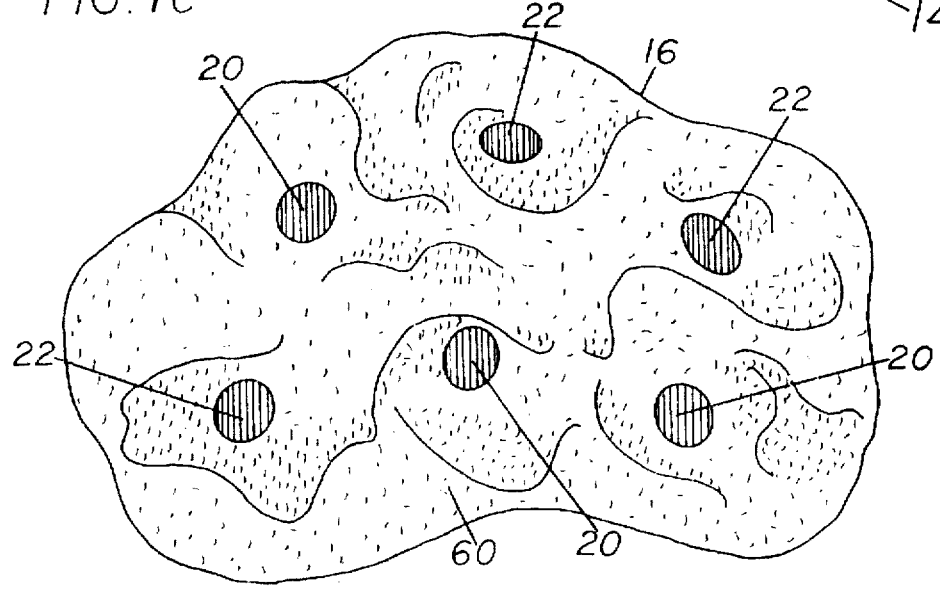

ANIMAL ATTRACTANT AND SCRATCHING DEVICE

FIELD OF THE INVENTION

The present invention relates to stationary and self moving devices that provide exercise and amusement for animals, but more particularly to a stationary device that takes advantage of an animal's inherent curiosity and instinct, by hidden or covert sounds, thereby provoking an animal into imminent physical contact or engagement with the various elements of the device.

BACKGROUND OF THE PRIOR ART

U.S. Pat. No. 4,577,590, by Skroch, 03/25/86 shows a wild mouse scratch pole comprising a mouse suspension and retraction unit that produces an audible sound at the point of full retraction. An animal or human has to initiate a downward pull and release of the static and silent lure before a sound can occur at the full retraction point. Unless the base is fastened to the finished floor of a home, this device tips over constantly, and the suspension string or tether is potentially harmful to a cat's soft spot between its toes, as well as a danger from entanglement. There are many animal related products, such as amusement, entertainment, grooming, claw scratching, housing or enclosure devices that do not fulfill their intended purpose, whereby the device just takes up space and disappoints the consumer.

SUMMARY OF THE INVENTION

The present invention takes advantage of the inherent instincts and curiosity of an animal's response to a luring sound on its own terms, when the original luring sound is not initiated by an animal or human hand, but by the device itself. Generally, the present invention is comprised of an irregular shaped housing formation resembling a rock with a flat bottom surface. The rock housing contains a dual circuit electronic sound synthesizer assembly. The first synthesizer circuit is powered by a small battery and is activated by a manual on and off switch. The second synthesizer circuit is activated by a pressure sensitive switch pad. The flexible pressure sensitive switch pad is accessed through an opening in the rock housing surface that extends substantially into the rock housing interior. The opening or well, to the interior of the housing, is sufficiently sized to receive the paw and a portion of the foreleg of an animal. When an animal's paw contacts the pad at the bottom surface of the recessed opening, it activates the second synthesizer circuit. An additional recessed opening is added and contains a bristled projection at its bottom portion. When the first electronic sound synthesizer circuit is activated by the manual on and off switch, an intermittant mouse related scratching sound at spaced intervals occurs; for example, 15 seconds of intermittent scratching and 15 seconds of silence. This is repeated continuously as long as the manual on-off switch is closed. When an animal puts pressure on a pressure sensitive switch pad by its paw,when inserted through an opening in the rock housing's surface, the second synthesizer will emit a brief series of mouse related squeaks each time a switch pad is closed. The second circuit is always active for use, even when the first synthesizer circuit is open, thereby adding versatility to the device. The first and second synthesizer circuits have dissimilar sounds, thereby providing diversification. Additional openings contain bristled projections at their bottom ends to further intrigue an animal. The preferred sound is that of a mouse producing scratching noises within an enclosed area. This scratching sound, when tested by applicants, proved to be extremely effective. The cats would spend a great deal of time and effort investigating, sniffing, and clawing at an enclosure emitting this particular sound. The animal's unrewarded attempts at the elusive sound within the device housing produces an abundance of claw scratching, necessary for its species.

OBJECTS AND ADVANTAGES

It is therefore an object and advantage of the present invention to provide an improved and frequently used animal attractant device that has dissimilar lure sounds, and two independent circuits.

It is an object of the invention that an animal expend its surplus energy, thereby improving its alertness, coordination, and sleeping habits.

It is another object of the invention to provide a proven sound as the most effective means of luring an animal to a device for engagement and play.

Another object of the invention is that the device would relieve the animal from boredom, thereby saving areas of household furniture from claw scratching damage.

Yet another object of the invention is to simulate nature; to satisfy the animal's natural curiosity and inherent hunting and stalking instincts in a safe and humane way, thereby keeping the animal happy, healthier, and more content.

Other objects and advantages may be readily determined by the following descriptions.

BRIEF DESCRIPTION OF THE DRAWINGS

FIG. 1a is a perspective view of a hollow, irregular shaped rock formation assembly, housing a series of well-like recesses, and showing an opening on its bottom side.

FIG. 1b is a perspective view of an electronic sound synthesizer assembly affixed to a housing cover.

FIG. 1c is a perspective view of a recessed switch affixed to a housing cover.

FIG. 1d is an exploded perspective view of a switch pad assembly.

FIG. 1e is a top plan view of the rock formation assembly disclosing a claw scratching material affixed thereto.

COMPLETE DESCRIPTION OF THE INVENTION

FIGS. 1a and 1b in combination, show a perspective view of a rock shaped formation assembly 10 and an electronic sound synthesizer assembly 12. Assembly 10 is comprised of a series of recesses, and recess 20 within the interior of rock housing 16, contains a flexible and conductive pressure sensitive switch pad 24 above electrical contacts 23 of rigid disc 26. Pressing the conductive switch pad downwards bridges contacts 23, thereby closing an electrical circuit. Recess 22 within the rock housing 16 contains a rigid and rounded bristled projection 21 to further intrigue or occupy an animal. Electrical contacts 23 are parallel connected to wires 30 extendable to the outside of opening 19 of housing base 18, and are affixed to a partial plug 38 mated to partial plug 40 of assembly 12. Electronic sound synthesizer assembly 12 is comprised of a battery power source 32 affixed to a holder 34 having a wire 30 connecting to one terminal of partial plug 40, and one terminal of manual on and off switch 36. When manual on and off switch 36 is closed, the first synthesizer circuit 44 is activated through wire 30, thereby emitting a continuous intermittant mouse related scratching sound at spaced intervals. When paralled wire 30 is bridged by pressure sensitive switch pad 24, a second synthesizer circuit 46 becomes activated, thereby emitting a brief series of mouse related squeaks each time pad 24 is depressed. Both synthesizer circuits are integrally grounded and connected to common ground wire 42. The synthesizer assembly 12 is mounted to base portion 33. Base portion 33 is affixed to recessed housing ledge 25 by mating elongated tab 50 to opening 52, and hole 48 to hole 54 secured by screw 56, also shown in FIG. 1c.

FIG. 1c is a perspective view of the exterior side of synthesizer assembly 12 base portion 33 showing a recess 37 for manual on and off switch 36. The recess 37 prevents switch 36 from protruding beyond the base 33 surface.

FIG. 1d is an exploded view in perspective of the pressure sensitive switch assembly 14, comprised of a curved flexible conductive pad or membrane 24, affixed to a flat rigid disc 26 containing two raised contact terminals 23 connected to wires 30.

FIG. 1e is a top plan view of a rock shaped formation showing a series of recessed openings or wells in housing 16. Recesses 20 contain pressure sensitive switch pads, and recesses 22 contain rigid and rounded bristled projections. The housing surface 16 is substantially covered with a claw scratching material such as carpeting 60. The above animal attractant lure concept should not be limited to a stationary form, as it is perfectly suitable for housing forms that are rollable, slideable, and swingable.

REMARKS AND CONCLUSION

Thus, it is clearly evident from the above illustrations and teachings, that the present invention does perform in an outstanding manner, and solves the shortcomings of passive and active devices past and present. For example, passive or stationary devices with mounted or tethered lures, or catnip outside or within their housings, require a human to initiate the first movement or engagement before an animal participates with the device. Static devices are ignored by most animals. Self moving devices containing motors within their housings are too expensive, extremely prone to malfunction, and drain batteries very quickly. The present invention is inexpensive for its multiple purpose role, rugged, long-lived, reliable, has an extremely effective lure function, and the battery has a very long life, thereby assuring years of economy and use, and satisfying the consumers investment. Other variations of the above teachings are apparent; for example, the synthesizers could be programmed with other lure sounds, such as barking, meowing, or talking, suitable for canines. It would further be obvious to use a different shape or theme to house the synthesizers, or suspend a tethered lure housing. Scratching related sounds can also be created by electromechanical means. While the above teachings contain many specific details and equivalents, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. An animal attracting and scratching device comprising:

a) a housing having a base and a continuous outer surface extending from the base so as to define an enclosed interior space;

b) a plurality of unobstructed openings disposed in said outer surface of said housing; each opening being so sized and configured so as to permit an animal to insert its paw therethrough;

c) an electronic sound synthesizer circuit disposed in the interior space of said housing; and d) at least one pressure activated momentary contact switch electronically connected to said sound synthesizer, said at least one switch being disposed in the interior space of said housing beneath at least one of said openings so as to permit activation thereof by the animal placing its paw through said at least one opening.

2. The device of claim 1, wherein said continuous outer surface has an irregular shape and said base of said housing is substantially planar with a corresponding irregular-shaped peripheral edge, such that said device resembles an irregular-shaped rock.

3. The device of claim 1, wherein said sound synthesizer circuit produces animal attracting sounds.

4. The device of claim 3, wherein said animal attracting sounds are mouse-like scratching sounds.

5. The device of claim 3, wherein said animal attracting sounds are mouse-like squeaking sounds.

6. The device of claim 1, further comprising a plurality of tubular, tunnel-shaped members, each tubular member extending from one of said openings inwardly to a distal end disposed within the interior space of said housing, said at least one pressure activated switch being disposed at the distal end of the tubular member extending from said at least one opening.

7. The device of claim 6, wherein at least one of said tubular members includes a rounded bristled projection at the distal end thereof.

8. The device of claim 1, further comprising a second sound synthesizer circuit disposed within the interior space of said housing and a manual on-off switch disposed on said housing and connected to said second sound synthesizer circuit for manually activating said second sound synthesizer circuit, said second sound synthesizer circuit continuously producing intermittent mouse-like sounds when said manual on-off switch is closed.

9. The device of claim 1, wherein the continuous outer surface of said housing is molded of a relatively soft material such that an animal can effectively scratch its claws thereon.

10. The device of claim 1, wherein the continuous outer surface of said housing has a relatively soft material thereon such that an animal can effectively scratch such material with its claws.

* * * * *